United States Patent [19]
Billings et al.

[11] Patent Number: 6,035,351
[45] Date of Patent: Mar. 7, 2000

[54] STORAGE OF USER DEFINED TYPE FILE DATA IN CORRESPONDING SELECT PHYSICAL FORMAT

[75] Inventors: Russell Allen Billings; Dana Henry Brown; Earl A. Cunningham; Richard Greenberg; Hal Hjalmar Ottesen, all of Rochester, Minn.

[73] Assignee: International Business Machines Corporation, Armonk, N.Y.

[21] Appl. No.: 08/184,417

[22] Filed: Jan. 21, 1994

[51] Int. Cl.[7] ................................................ G06F 13/10
[52] U.S. Cl. ........................ 710/74; 711/112; 360/48; 369/93; 369/111
[58] Field of Search ................................. 395/425, 700; 360/48; 369/93, 111; 711/112; 710/74

[56] References Cited

U.S. PATENT DOCUMENTS

| | | |
|---|---|---|
| 4,700,335 | 10/1987 | Aoi ........................................ 369/44.31 |
| 5,138,599 | 8/1992 | Fukushima et al. ....................... 369/54 |
| 5,166,921 | 11/1992 | Matsui ................................. 369/275.3 |
| 5,202,875 | 4/1993 | Rosen et al. .............................. 369/94 |
| 5,253,124 | 10/1993 | Kondo et al. .............................. 360/48 |
| 5,369,533 | 11/1994 | Ottesen et al. ............................. 360/51 |

OTHER PUBLICATIONS

Alan Simpson, "Mastering Word Perfect 5.1 & 5.2 for Windows", SYBEX, 1993 p. 406.

*Primary Examiner*—Kenneth S. Kim
*Attorney, Agent, or Firm*—Andrew J. Dillon

[57] ABSTRACT

Storing data on a data processing system is done upon generation of a data file by displaying a user interface allowing user selection of storage criteria for the data file. Responsive to user selection of storage criteria for a file determining a physical format type for the file from a plurality of available physical format types. Then the file is stored on a direct access storage device as at least a first record conforming with the determined physical format type.

29 Claims, 12 Drawing Sheets

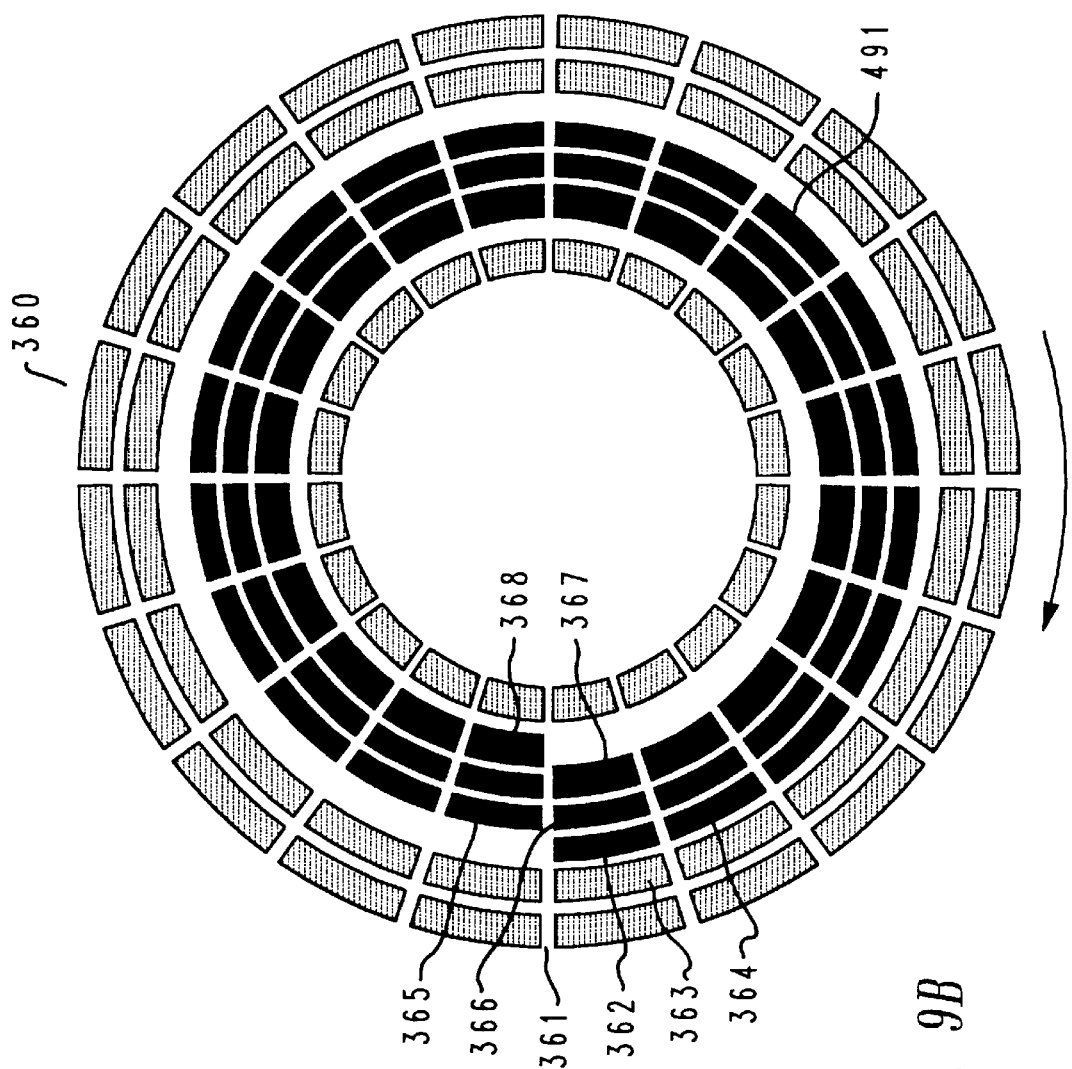

STORAGE OF USER DEFINED TYPE FILE DATA IN CORRESPONDING SELECT PHYSICAL FORMAT

BACKGROUND OF THE INVENTION

1. Technical Field

This invention relates to direct access storage devices (DASD) and more particularly to a system and method for supporting user specification of physical file formats for files.

2. Description of the Related Art

A disk drive is a data storage device which utilizes at least one rotatable disk with a magnetic medium on a major surface of the disk. Data are represented on the medium as a series a physical transformations of portions of the magnetic medium. The physically transformed regions are arrayed as data tracks at defined locations.

In magnetic disk hard drive systems, a transducer used to read and write data to the disk forms a portion of a body called a slider. The slider flies just off the surface of a rotating disk. The slider is attached on its backside to a suspension system which in turn is connected to an actuator arm. The actuator arm is used to selectively position the head over a desired track or track location during a read or write operation. The slider itself may be moved radially inward or outward to change the track over which the slider is positioned. Movement of the slider between concentric data tracks takes time both for the movement and for damping motion of the slider at the end of a movement.

The term format embraces several aspects of arranging and interpreting items recorded on the storage media. For example, digital data may be recorded using one of several coding schemes. Coding is a type of logical format. Physical formats for data tracks relate to physical location and arrangement of data, e.g. in concentric and spiral tracks.

The use to which the digital data is put has consequences for the physical format chosen for storage. For example, image data of both the still or video type implies demand for large quantities of data storage space. For video it can further be anticipated that there will be large bandwidth demands due to real time reproduction requirements. For video data, the order in which data is recovered is also highly predictable. It is good design to arrange tracks of video data in such a way as to coordinate movement of the slider (or other transducer) with simultaneous readout of data. Spiral tracks work best for this. Using spiral tracks and storing data in the order for recovery along the spiral tracks allows the slider to be kept moving continuously inward or outward along the tracks during reading. No time is lost moving the slider between tracks or for stabilizing position of the slider after movement between tracks.

Text files and other similar coded material are typically smaller than still image and video files. Records formed from text files need not be contiguous, allowing maximum utilization of available space. Concentric tracks aid in locating all such portions of such records quickly during a read operation.

SUMMARY OF THE INVENTION

It is an object of the present invention to provide a system and method for selecting physical formats for files upon storage.

It is another object of the invention to enhance storage and recovery of data to and from direct access storage devices.

Other objects, features and advantages will be apparent in the written description of the invention that follows. The system and method of the invention provide for storing data for a data processing system upon generation of a data file by displaying a user interface allowing user selection of storage criteria for the data file. Responsive to user selection of storage criteria for a file a physical format type for the file is determined from a plurality of available physical format types. Then the file is stored on a direct access storage device as at least a first record conforming with the determined physical format type.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 9B is a top view of a disk surface illustrating a not-to-scale layout of tracks and sectors including some spiral recording;

The drawings are not intended as a definition of the invention but are provided solely for the purpose of illustrating the preferred embodiments of the invention described below.

DETAILED DESCRIPTION OF THE INVENTION

Figure 1:
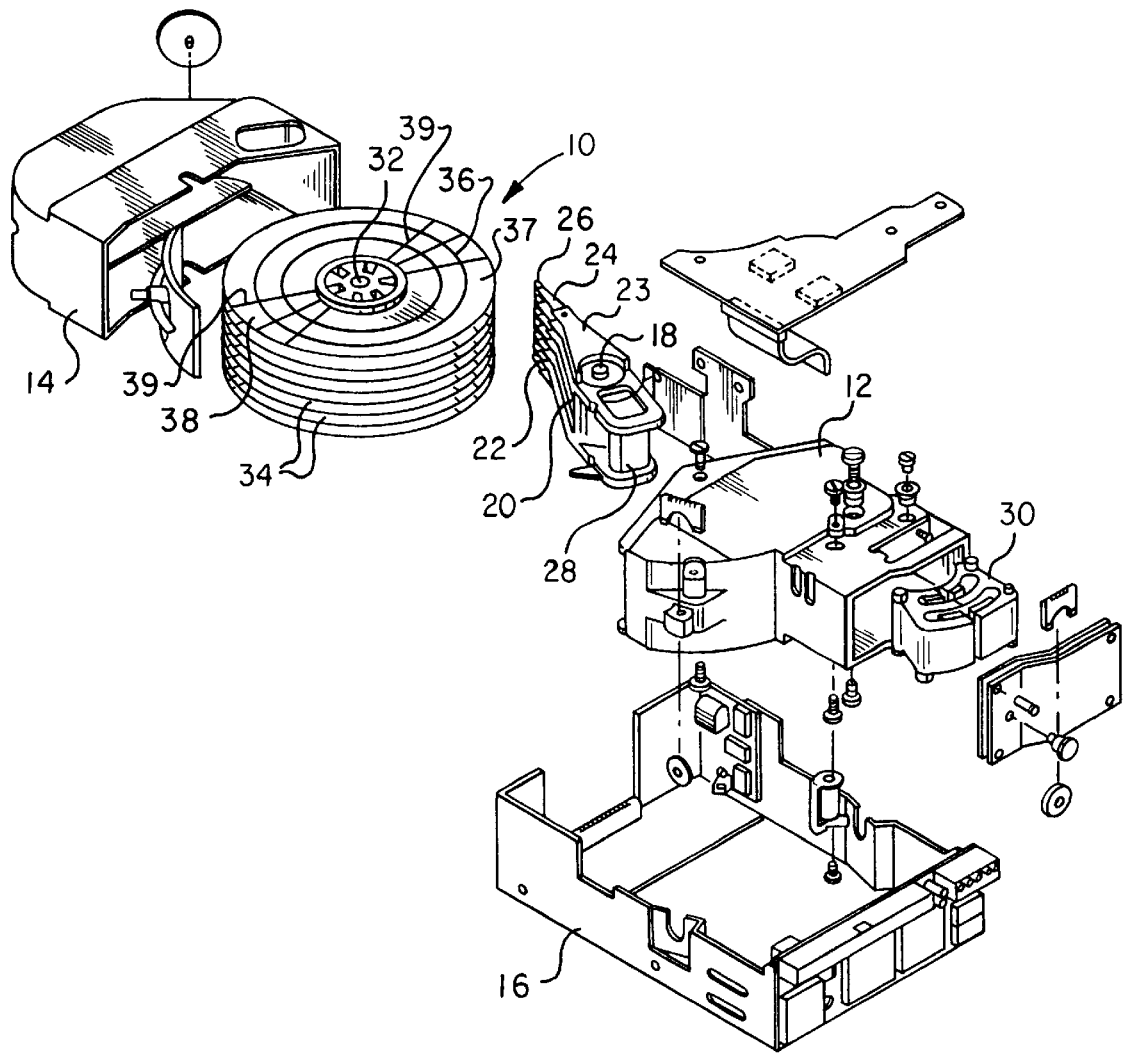
FIG. 1 is an exploded view in perspective of a disk drive from the prior art.

FIG. 1 is an exploded view of a disk drive 10. It should be noted that although a rotary actuator is shown, the invention described herein is also applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. In this case, the load springs form the suspension. Attached at the end of each load spring is a slider 26 which carries a pair of magnetic transducers or the head. The transducers may be of an inductive type, or may include a read transducer of a magnetoresistive type. On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator arm assembly 20 to rotate it about the actuator shaft 18. Also mounted within the housing 12 is a spindle shaft 32. Rotatably attached to the spindle shaft 32 are a number of disks 34. In the drive shown, eight disks are attached to the spindle shaft 32 although a fewer or greater number may be used. The disks 34 are attached to the spindle shaft 32 in spaced apart relation. An internal motor (not shown) rotates the disks 34.

Data is written arranged in tracks 36 on media applied to the major surfaces 37 of disks 34. Tracks 36 may be concentric, or they may spiral inwardly or outwardly. Concentric tracks 36 which occupy comparable locations on different major surfaces 37 are said to form a cylinder. Surfaces 37 are in turn divided into pie shaped sectors 38 by servofields 39. Servofields 39 are used for control of tracking of sliders 26 over tracks 36.

Figure 2:
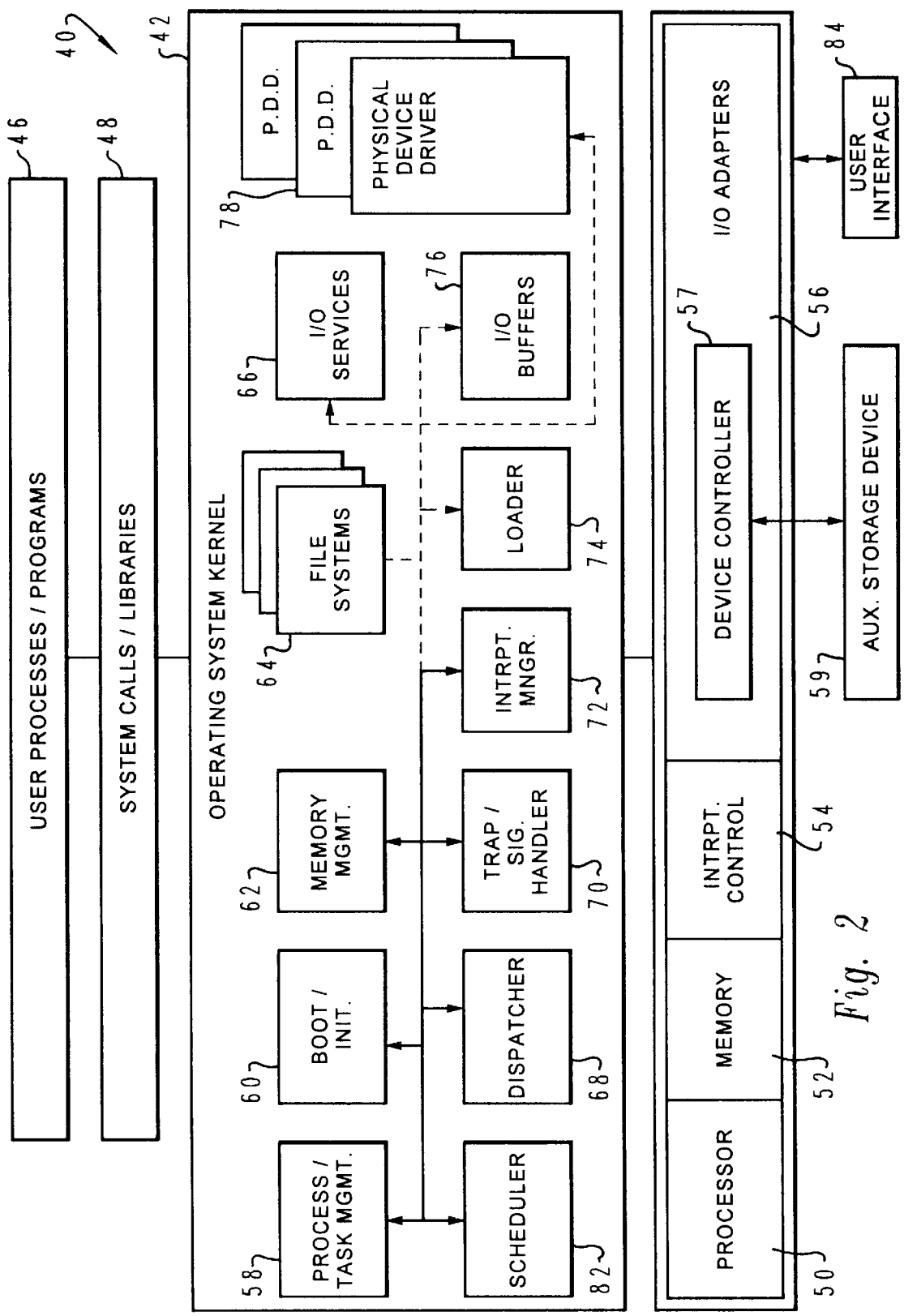
FIG. 2 is a block diagram of an operating system for a computer.

With reference to FIG. 2, there is depicted a high level block diagram illustrating software and hardware components of a data processing system 40 which may be utilized to implement the method and system of the present invention. Data processing system 40 includes an operating system kernel 42 which resides in a hardware system 44. The operating system is preferably provided by a disk operating system such as MS-DOS/ version 3.3 or later, available from Microsoft Corporation, or the OS/2 operating system available from International Business Machines Corporation. Hardware system 44 includes a central processing unit (CPU) 50 and a main memory 52. Hardware system 44 further includes an interrupt controller 54 and input/output adapters 56. Included among input/output adaptors 56 is device controller 57, which operates between the software of operating system kernel 42 and a direct access storage device 59.

User processes/programs 46 access, in a manner well known to those skilled in the art, selected procedures within operating system kernel 42 by means of system calls which are depicted at reference numeral 48. As is typical in such systems, selected procedures within operating system kernel 42 are designed to be called or invoked by applications within data processing system 40 and thereafter the task will return to the user program which invoked the operating system kernel procedure. In this manner, operating system kernel 42 acts as an interface between the user of data processing system 40 and hardware system 44.

Operating system kernel 42 is utilized to provide an environment in which various processes or programs may be executed. Operating system kernel 42 provides for the efficient utilization and prevents user application programs from interfering with the proper operation of data processing system 40 by controlling the creation and alteration of files, the control of input/output devices and the provision of multiple device drivers which permits data processing system 40 to interface with various external devices.

Operating system kernel 42 includes multiple asynchronous subsystems, including process/task management system 58 which is utilized to provide task creation, deletion, status and synchronization functions for user processes 46. Initialization system 60 typically is embodied in microcode in non-addressable memory and is utilized to load the operating system into memory 52.

Next, memory management system 62 is depicted. Memory management system 62 allocates and deallocates portions of computer memory 52. File systems 64 are preferably utilized to control the creation and deletion of files. A file is simply a named set of records stored or processed as a unit by a data processing system. Another aspect of files typically addressed within an operating system kernel is control of access to the files. Access control is utilized to ensure that an access to a file or directory is checked for correctness. Next, input/output services system 66 is depicted. Input/output services system 66 is preferably a functional unit within operating system kernel 42 which controls peripheral hardware.

Next, dispatcher 68 is depicted within operating system kernel 42. Dispatcher 68 places jobs or tasks into execution. Dispatcher 68 is thus responsible for providing multi-tasking and operates in conjunction with a scheduler to implement a particular type of scheduling system.

Trap and signal handler 70 is also depicted within operating system kernel 42 and is utilized to respond to traps and signals typically activated by hardware system 44. Among the signals generated by hardware 44 are page fault signals indicated operations relating to memory 52 and auxiliary memory 59 (Direct Access Storage Devices or "DASD") accessed through I/O adapters 56. Such page fault signals are subdivided into two categories corresponding to the type of memory being accessed. Page reclaim operations relate to a memory paging operation limited to memory 52. A page fault requiring I/O operations is the second category. Any auxiliary memory operation requires a relatively large amount of time to execute compared to central processor operation and page reclaims.

Interrupt manager 72 preferably manages interrupt handlers which are set up by the operating system kernel 42 and kernel extensions to take whatever action is necessary to respond to the occurrence of an interrupt. Loader system 74 is also depicted within operating system kernel 42 and, as those skilled in the art appreciate, is typically a routine which loads programs, libraries and kernel extensions. Input/output buffers 76 are depicted within operating system kernel 42 are utilized to temporarily store data during transfer from one hardware device to another in order to compensate for possible differences in data flow rate.

Next, scheduler 82 is depicted. Scheduler 82 orders specific tasks for dispatch to the processor upon indication that a task is "ready to run". Good design of the scheduling algorithm provides both effective use of central processing unit 50 by the various tasks and smooth response to user requests of data processing system 40.

A plurality of device drivers 78 are depicted. Device drivers 78 are typically utilized to attach and use various peripheral devices which may be coupled to data processing system 40. For example, displays, keyboards, printers, floppy disk drives, fixed disk drives and other auxiliary devices are typically controlled from data processing system 40 utilizing a device driver associated with the particular auxiliary device selected for control. Device drivers 78 are installable and operating system kernel 42 is adapted to admit additional and utilize additional units.

User interface 84, through a physical device driver 78 allow display to a user of data and user entry of data to the data processing system.

A file comes into existence when a collection of data is named. Much of operating system kernel 42 directly acts upon files. File systems 64 provide the mechanisms by which files are stored, referenced, shared and secured and allocate space for files on an auxiliary storage device 59. A name serves as a handle for storage of the data on an auxiliary storage device. The name is one of the parameters of a file descriptor, which is a control block used for managing a file.

Conventionally, file descriptors have included, besides a file name, a location for the file in auxiliary storage, the characteristics of file organization and a data type, among other things. File descriptors are typically maintained in auxiliary storage until brought into main memory 52 when a file is opened. The file descriptor is acted upon by operating system kernel 42 and, in the present invention, open for limited editing.

Implementation of the invention includes providing for user initiated editing and modification of the file descriptor to control physical aspects of storage of a file on auxiliary storage. Data may be written to a direct access storage device having a predefined physical file format, in which case data is directed to the areas having the preferred format types for the data, or to a device where physical file format is selectable. The physical file format relates to the arrangement and data density of data tracks to which the data of a file is written. In a device where the physical file format itself may be controlled, up to three variables may be subject to control, including: track type (e.g. concentric or spiral); linear density along a track (i.e. write clock frequency); and track pitch (i.e. the perpendicular distance between tracks, which is the inverse of track density). While the user might, under some circumstances, directly select values for these variables, it is preferable to provide a level of abstraction in presentation of these choices to the programmer/user.

Abstractions which should be meaningful to a programmer/user include: characterization of the data by type (e.g. is data coded or non-coded); whether error in readback of the file from auxiliary storage is tolerable and if so, at what maximum expected soft error rate (SER); the need for real time readback (as might be required for video data); subcharacterization of data within coded and non-coded types (e.g., non-coded subtypes include video, audio, still image and facsimile); among other items. Such factors may be applied to the controlled variable(s) through use of programming, or for systems of greater sophistication, by interposition of an expert system.

Figure 3:
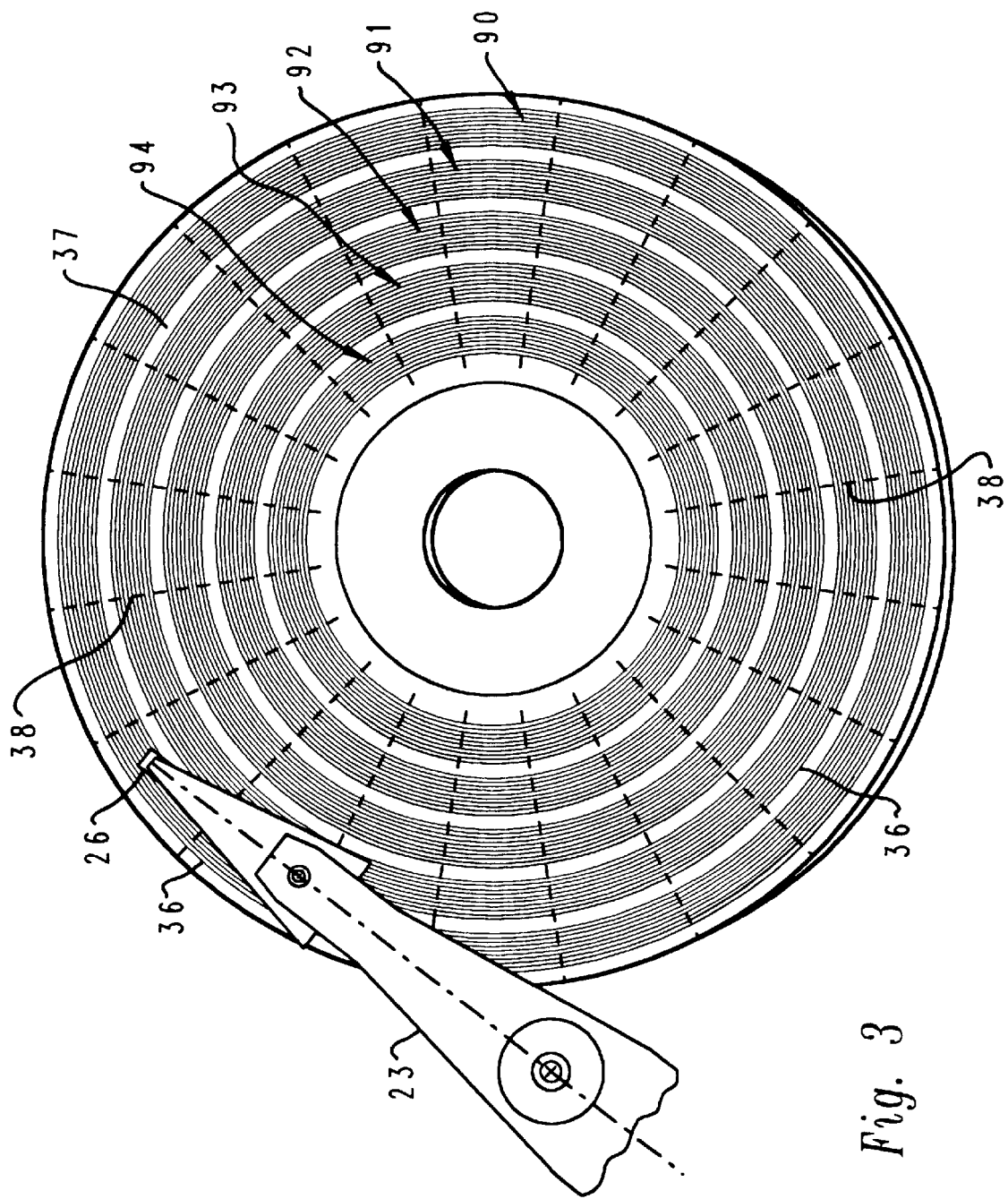
FIG. 3 is top plan view of a disk drive surface.

FIG. 3 is a top plan view of a major surface 37 of a disk utilized in practicing a first embodiment of the invention. In the first embodiment, the physical file format for surface 37 is predefined. On surface 37 a plurality of concentric tracks 36 have been grouped into zones or bands 90, 91, 92, 93 and 94. Bands 90–94 differ from one another in that the write clocks used for writing data to tracks 36 within each band differ in frequency. This technique is well known in the art where it is called "banding" or "zone bit recording". Banding has been used to increase the capacity of disk drives. Using banding, it is no longer necessary to write the entire disk at a single write clock frequency, which is low enough in frequency for use with the innermost track.

Where surface 37 is installed in a constant angular velocity disk drive, write clock frequency is increased as one progresses outwardly from the center axis of the disk toward the outer edge. For appropriately selected frequencies, linear spacing of bits remains approximately constant from band to band. Soft error rates largely depend upon the linear spacing of bits along a track, allowing write clock frequency to be increased on outer tracks without an increase in the soft error rate.

Figure 4:
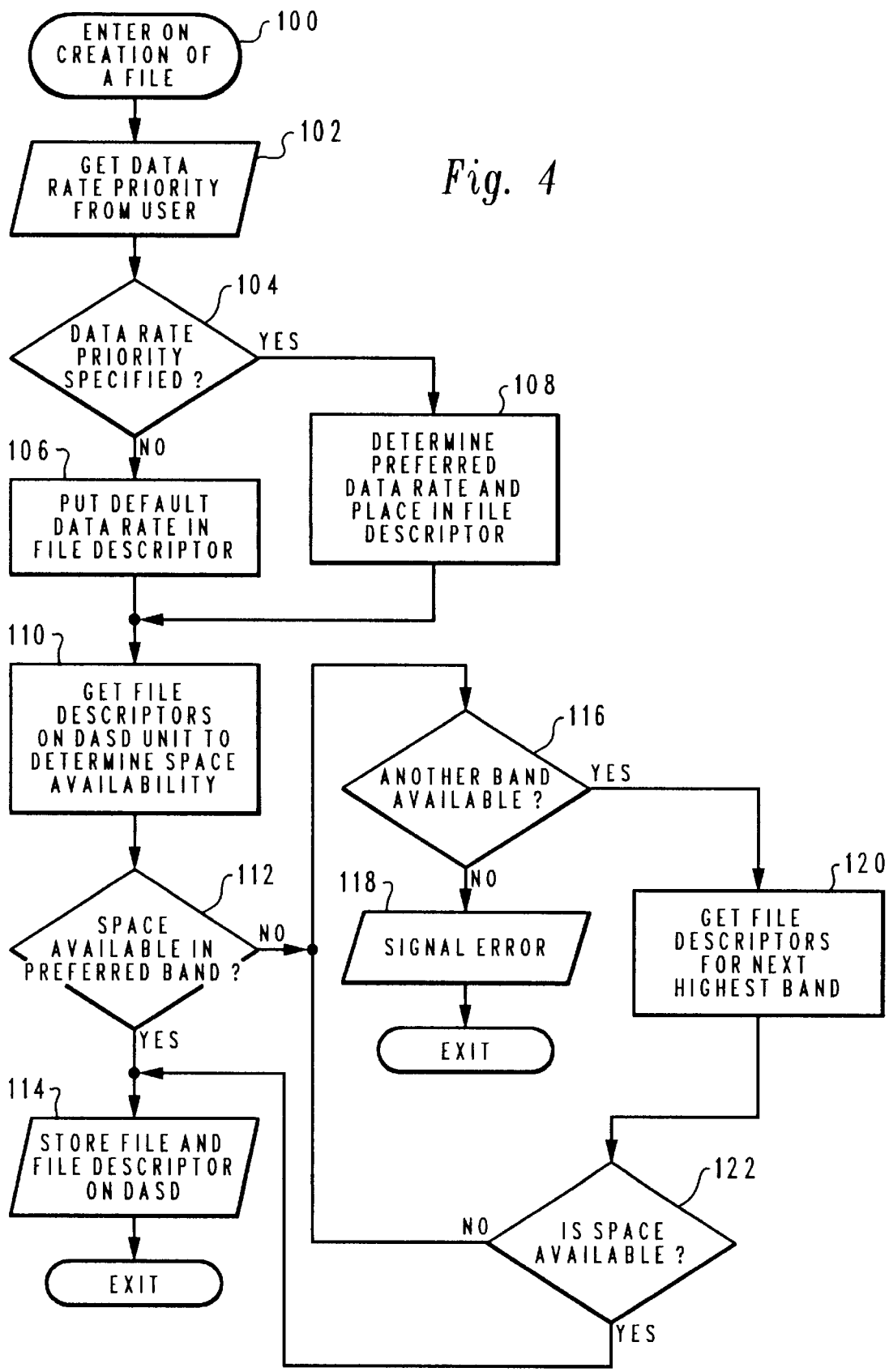
FIG. 4 is a logical flow chart of a process for editing a file descriptor.

FIG. 4 is a logical flow chart of an operating system process for editing of a file descriptor upon creation of a file. Such editing allows user/programmer selection of a data rate priority for the file. For example, the user may select the higher clock rates of the outer bands 90–93 for storage of time rate critical data, e.g. video, where real time reproduction is required. The process is entered at step 100 upon creation of a file, such as when a user designates a data record resident in memory 52 for storage or a file is transferred onto system 40 from an outside source. With execution of step 102, a user specification of data rate priority may be received. Such specification may, for example, specify that real time recovery is required, or that the data is a video clip (implying that real time recovery is required but some error is tolerable), or that the data is coded (e.g. ASCII) and error upon recovery is to be minimized.

At step 104 it is determined if the user has entered an indicator of data rate priority. If not, the NO branch is followed to step 106 and a default data rate is put in the file descriptor, typically the minimum data rate. Step 108 follows the YES branch from step 104 and provides for determination of a preferred data rate from the priority indicator supplied by a user. Once determined, the preferred data rate is placed in the file descriptor.

After either step 106, or step 108, step 110 is executed to access the file descriptors for files already stored on the desired band on surface 37. The file descriptors will indicate the space occupied by each file within a band, allowing determination (step 112) of whether the newly created file is small enough to fit within the band written at the preferred write clock. The available capacity of the band will be known from the size of the band and the extent of records already allocated thereto. The storage device is itself a type of special file with a file descriptor offering such information as storage capacity ranges. If space is available, step 114 is executed and the file and file descriptor are stored to surface 37.

If at step 112 it is determined that space is not available, the NO branch is followed to step 116, where it is determined if another band meets the minimum data rate requirements for the file. If not, step 118 along the NO branch is executed to signal error. If space is available, the YES branch is taken to step 120 where the file descriptors are accessed to determine available space. Step 122 provided for comparison of available space with size of the newly created file. If the band can accommodate the file, step 114 is executed to store the file to the band. If the file is still too large, step 116 is returned to. It is of course possible that records for a file may not require contiguous storage, in which case the records may be conveniently divided among different bands to aid in finding storage.

Figure 5:
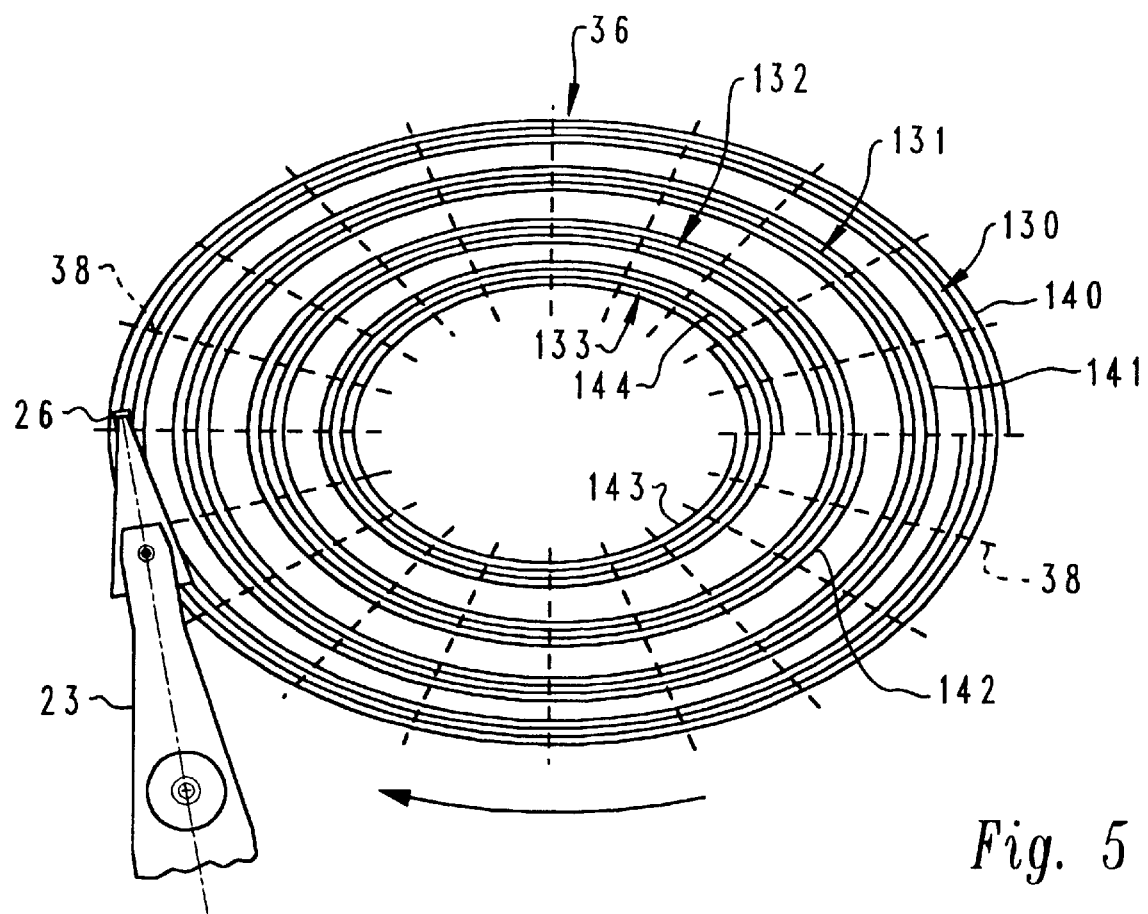
FIG. 5 is a schematic view of a disk drive surface.

FIG. 5 is a schematic illustration of a surface 36 having mixed physical file format types which differ in track pitch and track type. Linear density along a track may be varied to accommodate selection of write clock frequency as desired. Band 130 includes an inwardly spiraled track 140. Band 131 includes a plurality of concentric tracks 141. Band 132 is made up of an outwardly spiraled track 142. Band 133 is made up of inwardly spiraled tracks 143 and 144, which are interleaved and written at about twice the pitch of the tracks 140 and 142. Interleaved tracks 143 and 144 need not begin at the same servosectors 38. Interleaved spiral tracks 143 and 144, written at about twice normal pitch, could be used to store multiple related images adjacent to one another to allow fast switching between images. Such scene switching may be useful in video game applications allowing a player to assume a different view of a situation at will.

Different physical file formats are preferred for different types of files and read/write transducing systems. Differences in logical file organization depend upon the use to which the data is put. File organization is the manner in which records making up a file are ordered on an auxiliary storage device. One type of file organization is sequential organization, which must always be used in sequential storage devices such as magnetic tape. In a sequential organization records having a particular logical order may be placed adjacent to one another in that logical order to reduce latency and seek time in moving from record to record on a surface. Video is an excellent example of a non-coded file appropriate for treatment as a sequential file.

Another type of file organization is called "direct". In direct storage, records are randomly accessed by their physical addresses. Physical dispersal of the records for a file is potentially viable. Coded files, such as word processing documents, may be suitably organized as direct files, allowing the file to be placed into such openings as may appear here and there on a disk.

Video files require large amounts of storage capacity. Fortunately, video rarely requires lossless recovery, which allows use of data compression techniques and higher linear density recording than might otherwise be tolerated. On optical drive systems, video has preferably been written in a spiral format. Use of a spiral format, in which records physically follow one another in logical order, is used to virtually eliminate head settling track misregistration (HSTMR). The magnetic or optical reader may be moved inwardly or outwardly along a spiral at a constant velocity, without changes of acceleration. Changes in acceleration inevitably excite mechanical resonances in the slider suspension mechanism, in turn leading to head settling track misregistration.

Figure 6:
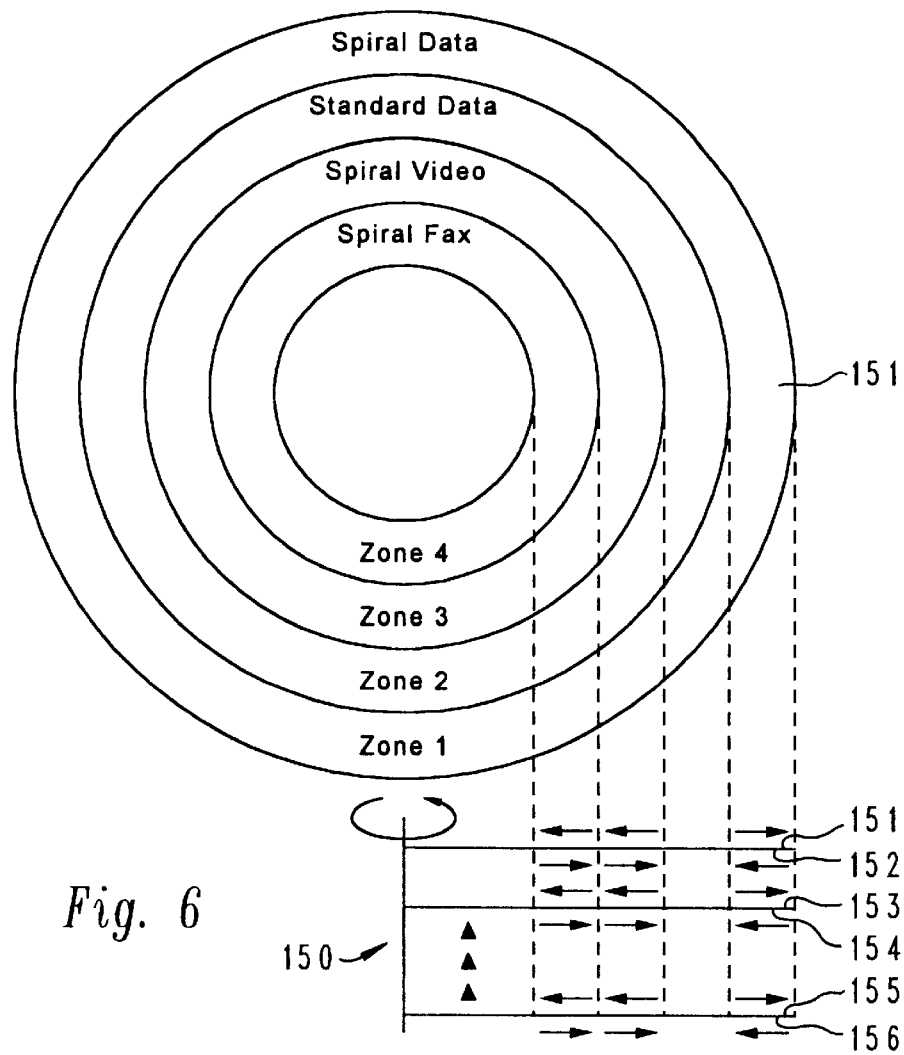
FIG. 6 is a schematic illustration of an arrangement of files on a direct access storage device.

With little HSTMR to compensate for it is possible to increase track density by 30% or more. As a further benefit, soft error rates fall, allowing linear density to be increased as well, further enhancing data areal density. By mixing physical format types to include concentric tracks, spirals, interleaved spirals, reduced pitches and variable linear density, a number of different file types may be stored on a surface (or the whole disk drive) in ways which enhance overall system performance in terms of increased auxiliary storage capacity and reduced elapsed time for recovery of data.

Where a disk pack is used, physical file formats may be arranged to interact from surface to surface. FIG. 6 is a schematic illustration of a disk pack 150 including a plurality of surfaces 151–156 divided into bands or zones. Spirals in a given zone may go inwardly on one surface and outwardly on the next surface allowing a file to be continuously written over a number of surfaces at the small mechanical cost of reversing the direction of movement of comb 22 (of FIG. 1) with each change of surface. One way to provide this would be for a spiral in a given zone to spiral inwardly on all odd surface and outwardly on all even surfaces. A file could then be written which would require almost no seek time once started.

If spirals on multiple surfaces are all spiraled in one direction, then the equivalent of different camera "takes" on a scene could be recorded on the different surfaces. The benefits are akin to those described above for interleaved spirals.

Servo control of slider position in a direct access storage device has been accomplished for concentric tracks on magnetic media in several ways in the art. The servo patterns define precise concentric circles on the sectors of a disk drive. The preferred method for the present invention utilizes a phase encoded servo pattern in the periodic servo-sectors 38 on a disk surface. A data track is written over the centerline of each servo track. Since the servo tracks are concentric it follows that the data tracks likewise are concentric.

Figure 7:
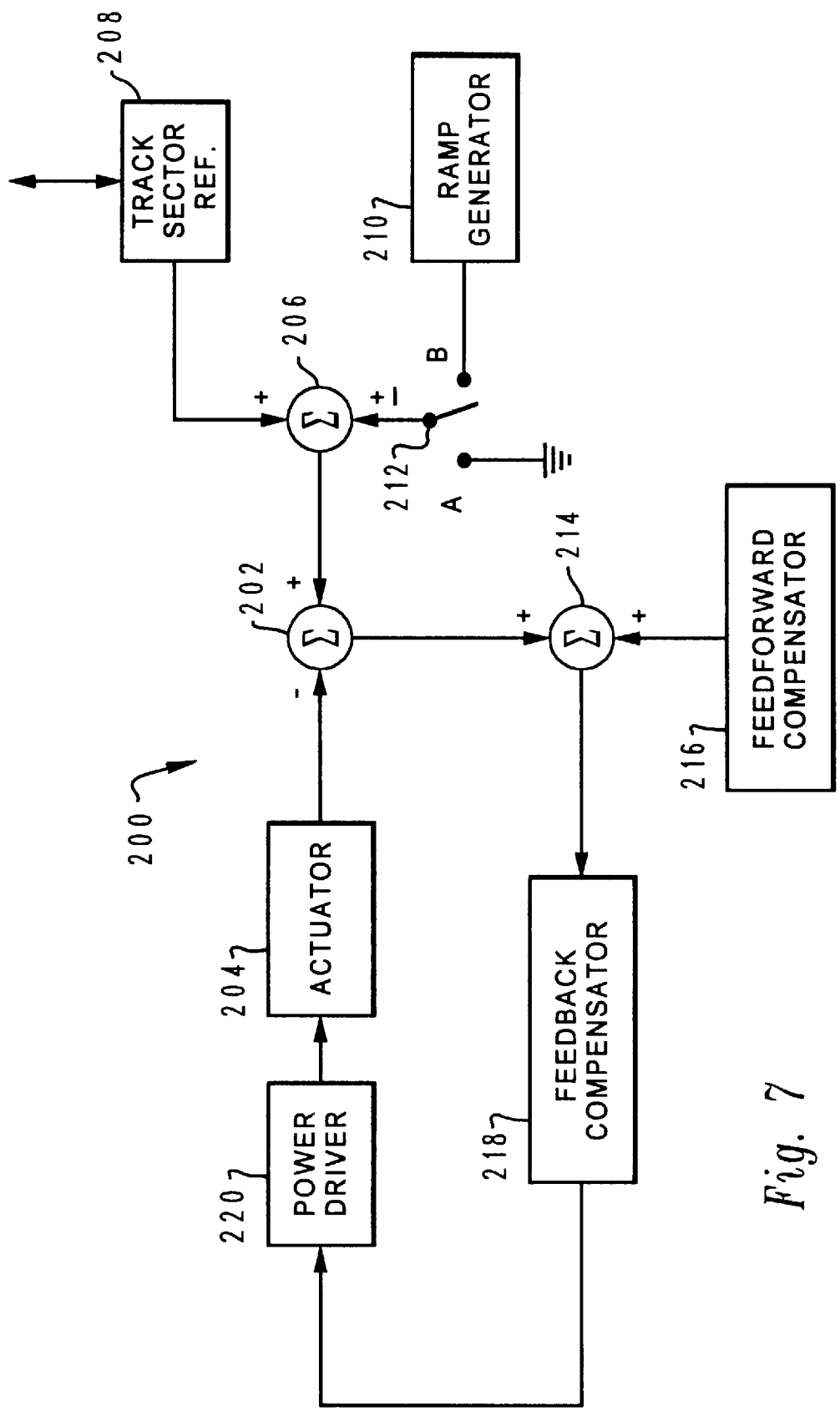
FIG. 7 is a block diagram of a disk drive actuator servo system.

Providing spiral formatted data tracks, variable pitch between tracks, or both, and adding concentric servo tracks of fixed pitch is done utilizing the head servo system 200 illustrated by block diagram in FIG. 7. Servo system 200 is used with a constant angular velocity disk drive. Head servo system 200 must move a slider (which carries the read and write transducers) at a constant velocity and meet a position target which changes by a fixed distance with each sector 38 encountered. Head servo system 200 is a feedback system utilizing a position error readback signal generated from the servo tracks for feedback. Keeping position error at zero while the slider is moving inwardly or outwardly at a constant velocity can be done by using a time dependent compensating factor to generate a modified position error signal. Changes in track pitch can be done by adding or subtracting a constant signal in generating a track sector reference signal.

Servo system 200 operates on the basis of a comparison performed by summer 202 on a position signal generated from servo sectors by actuator 204 and a reference signal. Actuator 204 moves a slider to position a transducer head centered over a data track. The reference signal is produced by a summer 206 from a track sector reference signal received from a reference signal source 208 such as a device controller and a ramp generator 210. Switch 212 represents logical control provided for switching system 200 from spiral mode to concentric mode represented by connection of summer 206 to ground. The output of ramp generator may be added or subtracted by summer 206 as required to generate an inward or outward spiral of the data track footprint. The track reference signal may be adjusted by a constant from source 208 to produce changes in pitch between tracks.

The output of summer 202 is taken as an input by summer 214, which adds it to the output of a feedforward compensator 216. Feedforward compensator 216 is used to minimize the effect of disk spindle shaft 32 runout. The output from summer 214 is applied to a feedback compensator 218 which performs filtering functions. The output of feedback compensator 218 is then applied to power drivers 220 which amplifies the feedback signal to drive actuator 204.

Figure 8:
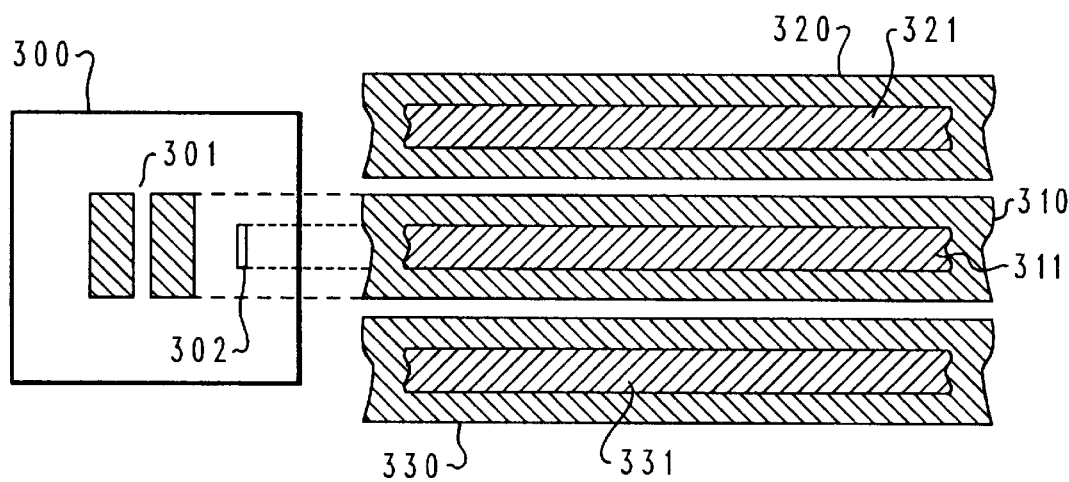
FIG. 8 is a schematic illustration of a magneto-resistive head and its relationship to data tracks.

Conventional magnetic transducing heads for disk drives are combined read/write devices. Some disk drives utilize a head having a magnetoresistive read transducer and a separate inductive write transducer. Use of a magnetoresistive (MR) head has certain consequences for employment of the invention as discussed below. FIG. 8 is a schematic illustration of a magnetoresistive head 300 and its relationship to data tracks 310, 320 and 330. Magnetoresistive head 300 includes an inductive write transducer 301 normally somewhat smaller than the track pitch and a magnetoresistive read transducer 302, which is approximately half the width of the track pitch. The footprint of read transducer 302, when indexed over tracks 310, 320 and 330, is indicated by traces 311, 321, and 331, respectively. Unlike conventional read/write heads, where the read and write transducers are inherently the same width since combined in one device, the read transducer 302 traces a path over data tracks which is inherently isolated from neighboring tracks because it is narrower than those tracks. The high output signal of an MR head provides sufficient signal with a quite narrow read width. The write wide/read narrow performance allows a significant percentage of TMR compared to the pitch, without degrading the error rate capacity.

A consequence of the narrow readback path traced by an MR transducer allows track pitch to be reduced by overwriting boundary regions between tracks when there is low TMR, as when writing or reading spiral tracks. The minimum achievable track pitch would be set to just avoid overwrite of the read trace paths. Significant gain in data storage device capacity can thus be achieved.

In practical applications, spiral tracks are written or read a few revolutions at a time. For a region selected for recording, the data rate of the recording will exceed the required data rate transmission to or from the user. Thus a buffer such as the input/output buffer 76 described in FIG. 2, must be used to allow for the difference in data rates. However in the long run, the data rate from the disk must average to the required user rate. This is accomplished by stopping the writing or reading, and accessing back one or more tracks. From there the head can track a spiral for one or more revolutions to bring the head back to the point where the writing or reading left off and the process can be resumed. In reading, this requires that the buffer hold the data from the one or more revolutions of delay, which must be delivered to the user during that time. In writing, the buffer runs out of data and the delay process of back tracking is used to allow the data from the user to accumulate. It is also desirable to maintain at least another revolution of data in reading, to allow one or more retries, in case the DASD was bumped and the reading failed.

Back tracking delays still maintain the low Head Settle Track Misregistration (HSTMR) since the access only takes a small portion of the revolution time, and the rest of the revolution is allowed for settle before the writing or reading is restarted.

Figure 9A:
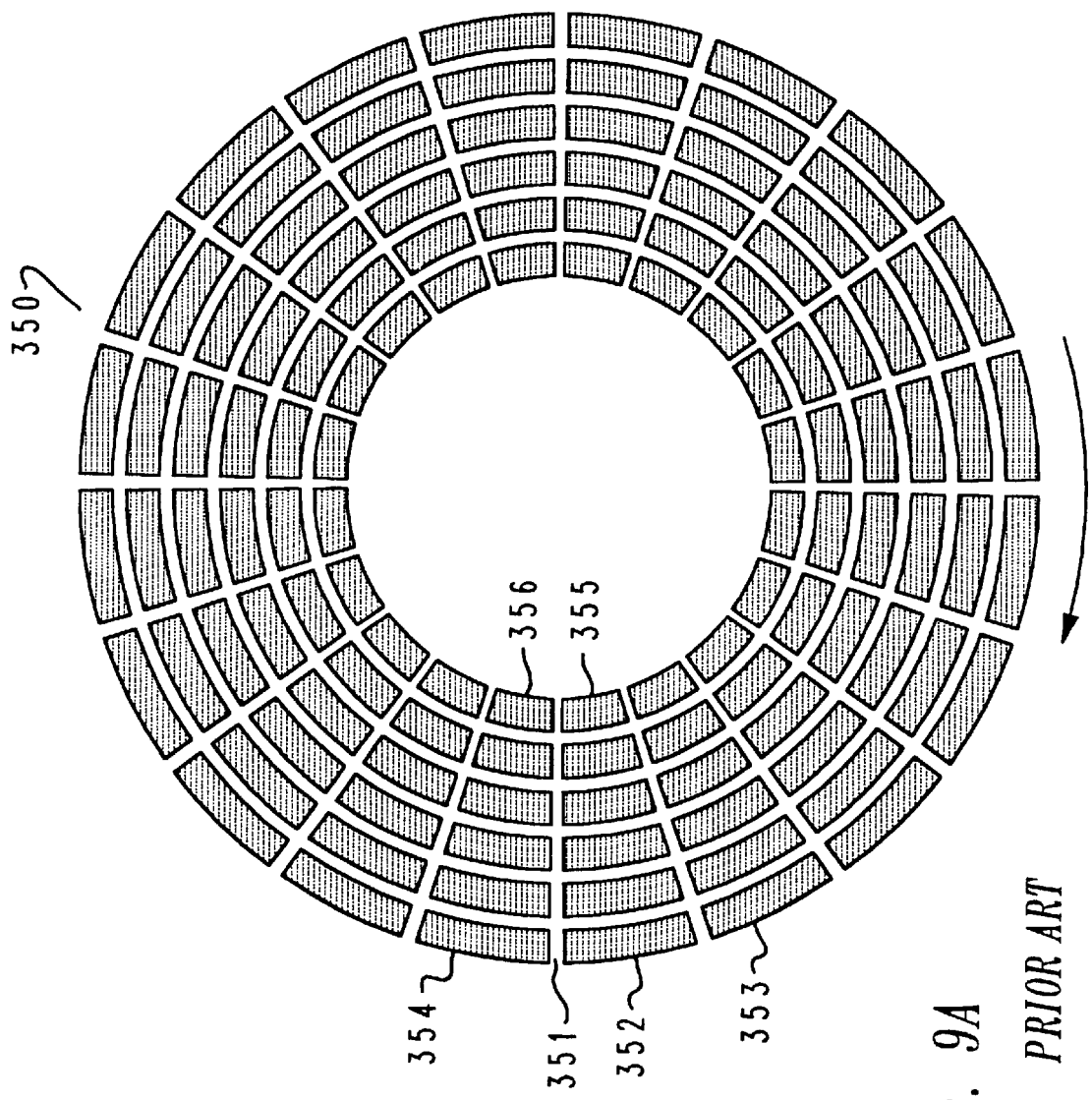
FIG. 9A is a top view of a disk surface illustrating a not-to-scale layout of tracks and sectors of the standard recording method.

FIG. 9A is a top view of a disk surface 350 illustrating the layout of tracks and sectors of the standard recording method. The dimensions and number of the tracks and sectors is not to scale. This illustration has only 6 tracks with 20 sectors. An actual disk surface would typically have many more tracks and sectors.

The shaded areas are where the user data are to be recorded. When sector servo is used, the servo bursts are written between the ends of the data region, such as at 351 between sectors 352 and 354 of the outer track. The servo is also recorded between all the ends of the data regions of the surface. The servo is recorded in a continuously repeating way within each of the radial spokes between data positions, such that the radial position is known to a very small fraction of a track, at any radial position. For clarity, these are not illustrated as the invention concerns relocation of the recorded data positions.

If the radial spoke of servo information through position 351 is selected as the physical index position, then data sector 352 may be identified as Sector 0, Track 0, and data sector 353 is Sector 1, Track 0. The 20th and last sector 354, on this track would be Sector 19, Track 0. The sector 355 at the start of the last shown track would be Sector 0, Track 5. The last sector 356 on this last track would be Sector 19, Track 5 which is also the last sector on the surface. The numbering of 20 sectors is from 0–19, and the 6 tracks are from 0–5. Tracks are disposed concentrically.

The recorded regions are typically slightly smaller than the allotted space, leaving a small separation between the recordings. This space helps reduce interference between tracks when actual track misregistration (TMR) is present as may occur if the recorded regions have some radial deviation and encroach upon one another to some degree.

FIG. 9B is a top view of a disk surface 360 illustrating the layout of tracks and sectors mixing spiral and circular recording. The outer two tracks and the inner most track (tracks 0, 1, 5) are positioned identically to those of FIG. 9A, with standard circularly recorded tracks. However instead of circular tracks 2, 3, 4 being recorded, that region 491 is now replaced with an inward spiral of three revolutions, and is shown by the darker shading in the figure.

The multiple revolutions of a spiral recording provide a significantly lower head settle track misregistration (HSTMR) than circular data recordings where the object is to retrieve sequentially recorded data as fast as possible, and some settle deviations are still present when recording or reading is allowed to start. A larger time will be allowed for settling before a spiral is started, to guarantee a low TMR at the start of the spiral. The first revolution of a spiral recorded sector 362, shown as starting after the index, is recorded slightly further inward compared to the normally recorded first sector of Track 2. Instead of the servo positioning the head to write at track position 2.00, it is started for example at 2.20. This provides an additional guard band so that the first sector 363 of Track 1 will not encroach upon the spiral recording with the higher TMR allowed for the normally recorded data tracks. The spiral is recorded for example, at a pitch of 0.60 (i.e. 60%) of a normal data pitch. For this to be a smooth spiral, the servo provides a linear division of this amount for each subsequent sector. For the assumed 20 sectors, this gives a change of 0.03 of an original pitch for each sector position relative to the previous sector. Thus the radial position of sector 364 is at 2.23 counting in original pitch numbers. The last sector 365 of the first revolution is at 2.77 pitch numbers and the first sector 366 of the second revolution is at 2.80 pitch numbers, which is exactly 0.60 of a normal pitch inward from the first recorded sector 362.

The sector 367 at the start of the third revolution is at 3.40 pitch numbers which is exactly 0.60 numbers above that for sector 366 at the start of the second revolution. The last sector 368 of the spiral is at position 3.97 pitch numbers. The standard data track at the inner diameter starts at its normal position of 5.00 pitch numbers. This leaves a smaller margin between the last spiral recording at the inner edge then left at the outer edge which is tolerable because of the wider written width of the last revolution of the spiral. Note that the recorded width of sectors 362 and 366 is narrower than recorded sector 367. All revolutions of a spiral are recorded at the same width but sector 366 was recorded after 362 and overlapped the recording and replaced the inner edge with the new recording. Similarly sector 367 was written over the inner edge of the sector 366 recording. Since the sectors written on the last revolution were not overwritten, they remain at the originally written width.

With use of an MR read head having a width of approximately ½ of a normal pitch, the remaining signal recorded width of a spiral at 0.6 of a pitch provides essentially full amplitude output of the MR read head. The resulting low TMR results in closer tracking to the correct position. Since the inner edge of the recorded spirals are overlapped in the recording process (except the last revolution), the optimum position of the read head is not at the center of the original recording. If it is assumed that the original recording is 0.9 of a track pitch, and with the 0.6 pitch of the spiral, then approximately 0.3 of the outer edge of the recorded track is erased by the recording of the next revolution. Thus the center of the remaining spiral recording is approximately 0.15 of a pitch outward from the original center position. Thus for example for sector 362 written at 2.20 pitch numbers, the optimum read head position would be 0.15 less, or at 2.05 pitch numbers. The actual offset would be determined for each head, just as the offsets of each head are normally determined in correctly placing the write and read elements for a standard recording.

In a normal spiral recording, there would be many more revolutions than the three indicated. Thus in reading the spiral, the head would typically be placed with the offset for the revolutions with the inner edges trimmed, and this would be maintained for the last revolution also. Thus since the read head does not use the most inner part of the recorded track on the last revolution, it can be placed nearer to the next track of normal data with the higher allowed TMR.

Figure 9C:
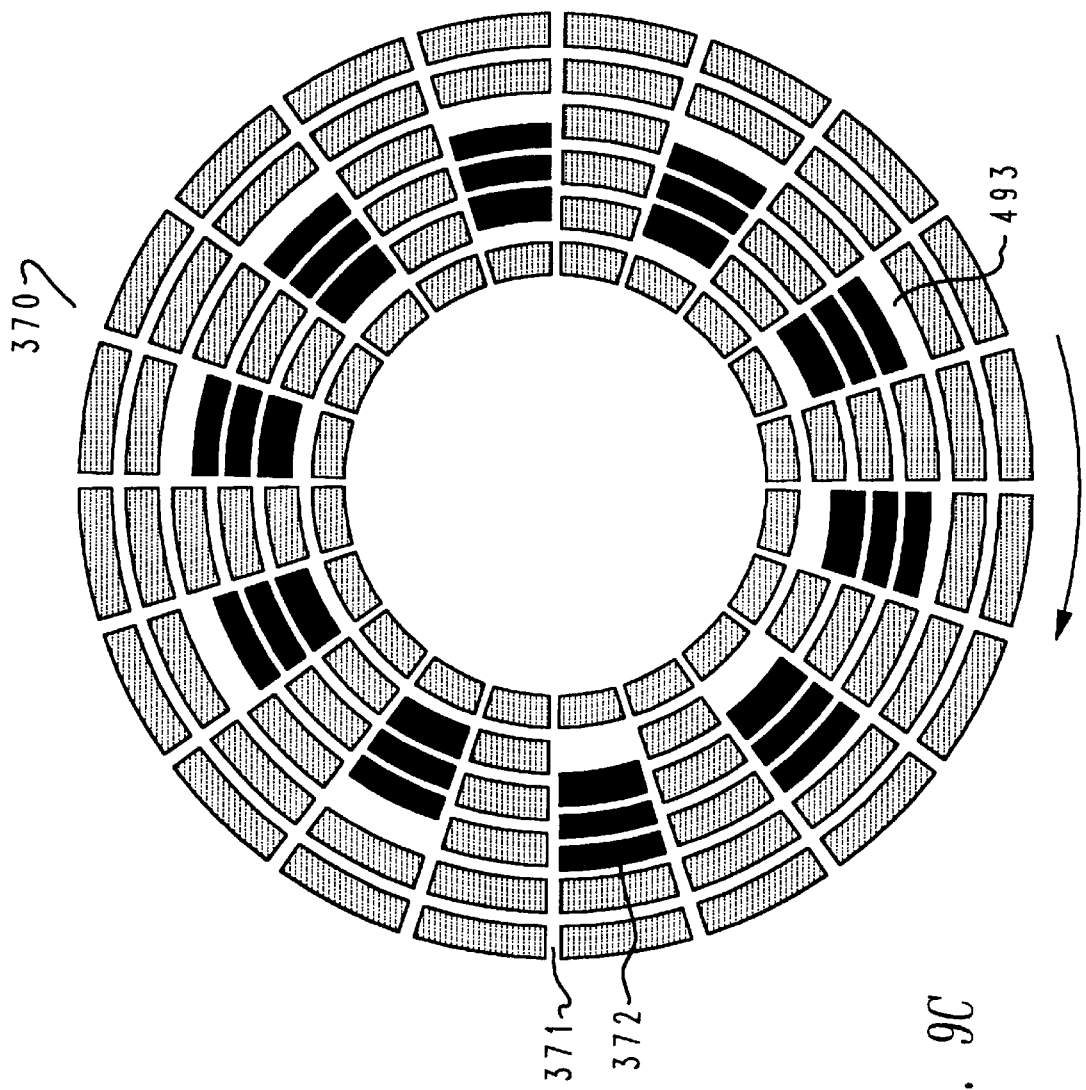
FIG. 9C is a top view of a disk surface illustrating the layout of tracks and sectors not to scale including spiral recording time multiplexed with standard recording.

FIG. 9C is a top view of a disk surface 370 illustrating the layout of tracks and sectors including spiral recording time multiplexed with circular recording. The outer two tracks and the inner most track (tracks 0, 1, 5) are positioned identically to those of FIG. 9A, with standard circularly recorded tracks. Within region 493 every other sector on a revolution is recorded with a spiral, which is again illustrated with shading. The first recorded spiral sector 372 is again shown after the index position 371, although other starting positions could be used. A spiral sector is not written in the next servo sector, but only in alternating ones. The servo positioning would be identical to that described for FIG. 9B, but spiral recording would only occur on Sectors 0, 2, 4, 6, 8, 10, 12, 14, 16, and 18.

Time multiplexed recording is useful with compressed video data for a DASD with high data rate, where use of some fraction of the sectors still provides an average data rate higher than that required for the average video data rate. This reduces the amount of data that would need to be buffered. The other sectors between the spiral portions could be recorded with normally spaced sectors for standard recording.

Figure 9D:
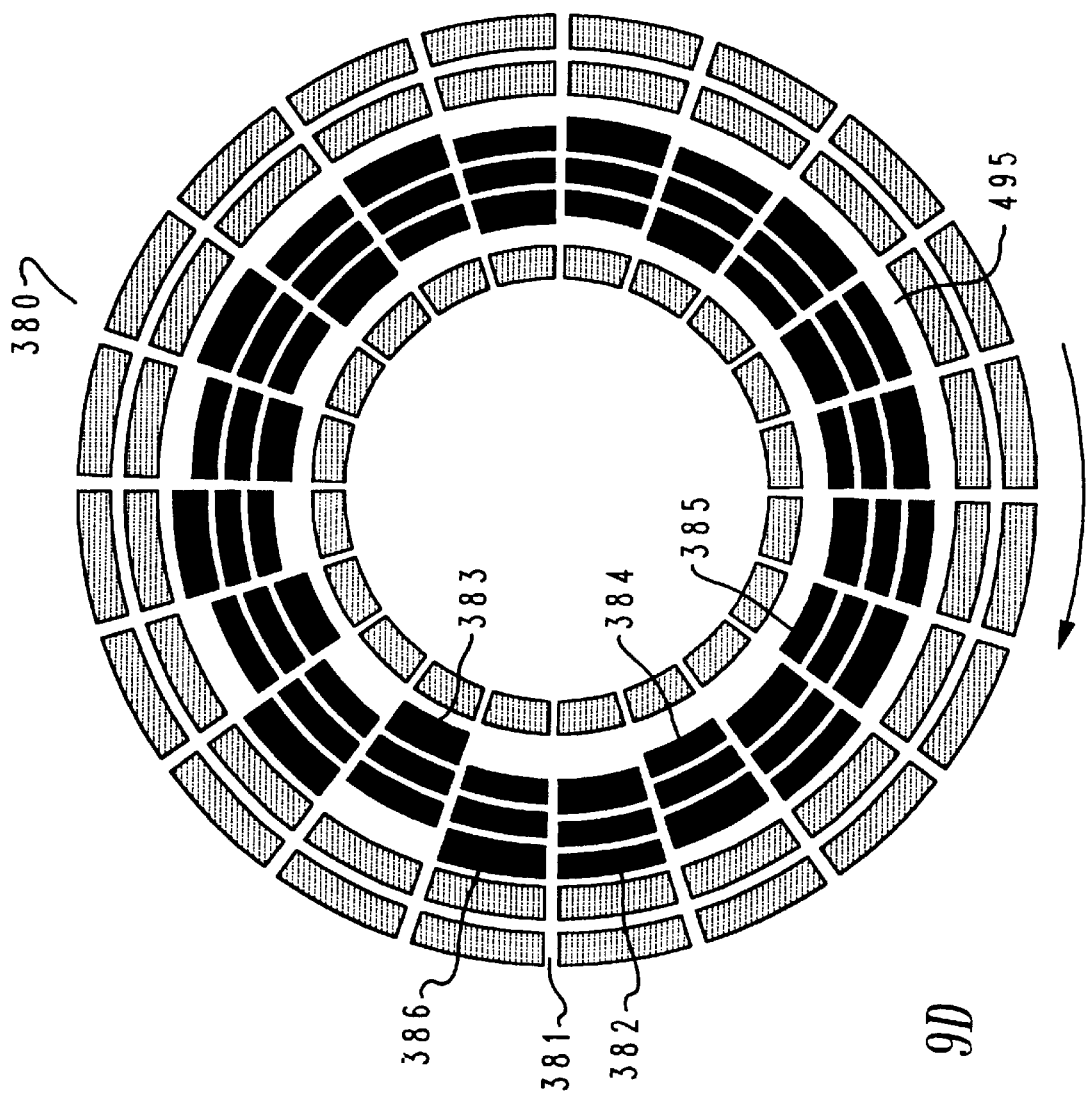
FIG. 9D is a top view of a disk surface illustrating a layout of tracks and sectors not to scale including two spiral recordings in opposite directions that are time multiplexed.

FIG. 9D is a top view of a disk surface 380 illustrating the layout of tracks and sectors including two spiral recordings within region 495, a first of which spirals in and the second of which spirals out. The two spirals are time multiplexed. The outer two tracks and the inner most track (tracks 0, 1, 5) are positioned identically to those of FIG. 9A, with standard circularly recorded tracks. In region 495, every other sector on a revolution is recorded with the inward spiral, just as illustrated in FIG. 9C. However in this case, a second spiral going from the inner edge toward the outer edge is time interleaved with the original inward spiral. The inward spiral sectors and the outward spiral are given distinguishing shading.

The first recorded inward spiral sector 382 is again shown after the index position 381. Only one of the spirals can be written at a time because the servo must follow the appropriate spiral track according to the direction of the spiral. The servo positioning is identical to that of a continuous inward spiral as described for FIG. 9B, but spiral recording would only occur on Sectors 0, 2, 4, 6, 8, 10, 12, 14, 16, and 18. The last sector of the inward spiral ends at sector 383, which in the sector counter, is Sector 18.

The outward spiral would start from sector 384, then to sector 385 and continued to the last outward spiral sector 386. Note that the sectors recorded on the outward spiral are Sectors 1, 3, 5, 7, 9, 11, 13, 15, 17, and 19 of the sector counter.

Such a double time multiplexed spiral can be used to create a continuous play loop with no time loss in the recording. A head could first follow the inward spiral in then the outward spiral out. This is useful for situations where the required user data rate can be provided by the average rate in reading every other sector.

In reading sector 383, the last sector of the inward spiral, the read head will be positioned inward of the center of the recording as previously described. The optimum position of reading 384 is at essentially the same radial position, so no access is required to begin reading the start of the outward spiral. However the small effect of reversing the direction may cause a small amount of TMR. If necessary, it is possible to leave out one or more of the last sectors of the inward spiral and one or more of the initial sectors of the outward spiral to settle the minor disturbance. Since the data rate average is required to be somewhat higher than the user rate, the buffer can cover the small difference, and the average is made up in a relatively short distance. As the head reads sector 386, the last sector of the outward spiral, it is identically positioned to read sector 382 starting the inward spiral, again remembering that the read position of the head will be slightly inside of the center of sector 386, just as if it were trimmed by a following revolution of a spiral. Again, beginning and end sectors may be eliminated if necessary, and made up by the average higher data rate within a small time.

In FIGS. 9B, 9C and 9D, it may be seen that three tracks of standard recording were replaced with three tracks of spiral recording. In an actual recording, there would be significantly more revolutions of a spiral recorded than for the illustrations in these figures. In general, the number of tracks allowed in a spiral with a pitch of 0.60 of the standard data pitch will be 1/0.60 or 1.6666 times as many tracks. However, there are two spiral tracks lost to edge guard bands at the ends of the spiral. Thus if there were 300 data tracks, then for the illustrated example, there could be 500−2 or 498 tracks of spiral recording allowed, or 1.66 times as many tracks as allowed with concentric tracks.

Figure 10:
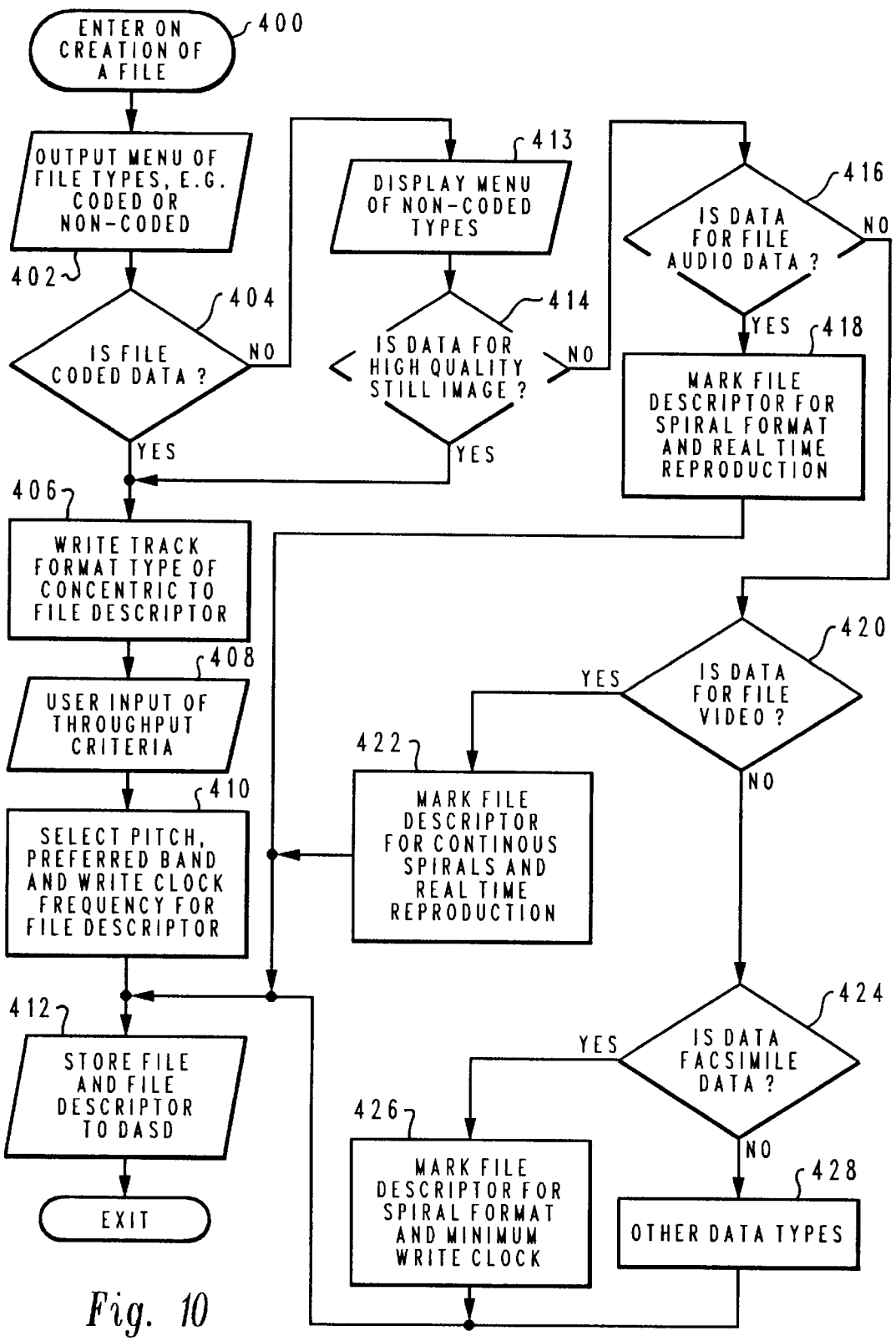
FIG. 10 is a logical flow chart of a process for editing file descriptors.

FIG. 10 is a logical flow chart illustrating a process for editing file descriptors for control of physical file formats upon storage of data in a file. The process is entered at step 400 with creation of a file. At step 402 a menu of file type selections is displayed to a programmer/user. For purposes of illustration, the user is first prompted to select between "coded" and "non-coded" data file types. At step 404, the file type selected is determined.

Where the file type "coded" is selected, step 406 is next executed to set the value of certain variables in the file descriptor for the newly created file, here the track type. Track type can be concentric or spiral. Next, at step 408, the user is prompted to indicate if there are any throughput requirements for the coded data. From the throughput requirements, if any, step 410 determines a track pitch, a preferred band and write clock frequency for the file descriptor. Step 412 is then executed to store the data to a file on the direct access storage device. Instructions are issued from the operating system to the device controller to control storage operations based in part upon the file descriptor. Step 412 may include error procedures to follow where insufficient space is available for storage of a file.

Where data in non-coded, step 413 follows step 404. With step 413 the user is presented a menu of non-coded data types. Step 414 is then executed to determine if the data is a high quality still image. Because real time reproduction of a still image may not be required, the system may be programmed to store such data on concentric tracks. Determination that a still image is to be stored then results in the process continuing with step 406 as described above. In multimedia applications, text or audio may be associated with the image. Text data may be coded and handled along the coded path while audio data may be non-coded and handled separately.

The No path from step 414 is taken where the data are determined to be other than still image data. At step 416 it is determined if the data are audio data, and if so, step 418 is executed to mark the file descriptor for a spiral format and real time reproduction. A required data rate may be generated. Step 412 follows to handle storage of the file to a direct access storage device.

Following the NO branch from step 416 is step 420, which when executed determines if the data to be placed in a file is video data. If the data are classified as video data, step 422 is executed to mark the file descriptor for continuous spiraling format (e.g. in on one surface and outward on another surface). Real time reproduction may be demanded through a minimum required data throughput level. Step 412 follows for storage of the file.

Following the No branch from step 420, step 424 is executed to determine if the data are classified as facsimile data. If YES, step 426 is executed to mark the file descriptor for a spiral format. A minimum write clock may be specified since real time reproduction is not required. Step 412 follows for storage of the file.

Along the NO branch from step 424, other data types may be handled (indicated by step 428).

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:
  a direct access storage device;
  means for generating data files;
  a user interface allowing user designation of file type upon generation of a data file;
  means responsive to user designation of the file type for a file for determining a physical format type for the file from a plurality of available physical format types; and
  means for storing the file on the direct access storage device as at least a first record conforming with the determined physical format type.

2. The data processing system of claim 1, wherein the direct access storage device is a constant angular velocity disk drive and the available physical format types are a plurality of data track bands written at differing write clock frequencies.

3. The data processing system of claim 1, wherein the user interface allows a user to specify throughput criteria for the file and the means for storing the file on the direct access storage device writes records to data track bands having a write clock frequency meeting the user specified throughput criteria.

4. The data processing system of claim 1, wherein the plurality of physical format types include spiral and concentric data tracks.

5. The data processing system of claim 1, wherein the direct access storage device is a disk drive and a physical format type includes a characterization as an inward spiral, an outward spiral, or a concentric data track.

6. The data processing system of claim 5, wherein a physical format type includes a characterization of track to track pitch.

7. The data processing system of claim 6, wherein a physical format type includes a characterization of write clock frequency.

8. The data processing system of claim 7, wherein the disk drive comprises a plurality of disks having two major surfaces each for storing data, the major surfaces of the disk drives having corresponding addresses differing only a variable relating to the particular surface, characterization of a physical format type for a file allowing alternation of inward and outward spirals from major surface to major surface.

9. The data processing system of claim 5, wherein spirals are track interleaved.

10. The data processing system of claim 8, wherein a plurality of physical format types occur on one major surface.

11. The data processing system of claim 9, wherein the means for storing includes:
  a buffer between the direct access storage device and the means for generating data files for compensating between differentials in data rates; and
  means for back accessing tracks on the direct access storage unit for compensating between differential data rates.

12. The data processing system of claim 1, wherein the direct access storage device includes:
  a plurality of surfaces; and
  a plurality of corresponding spiraled tracks on each surface.

13. The data processing system of claim 12, the corresponding spiraled tracks being recorded with different views of a scene.

14. A method of storing data on a data processing system, comprising:
  generating a data file;
  displaying a user interface allowing user designation of file type for the data file;
  responsive to user designation of the file type for a file determining a physical format type for the file from a plurality of available physical format types; and
  storing the file on a direct access storage device as at least a first record conforming with the determined physical format type.

15. A method as set forth in claim 14, wherein the direct access storage device is a constant angular velocity disk drive and the available physical format types are a plurality of data track bands written at differing write clock frequencies.

16. A method as set forth in claim 15, further including the step of allowing user specification of throughput criteria and wherein storing the file on the direct access storage device includes writing records to data track bands having a write clock frequency meeting the user specified throughput criteria.

17. A method as set forth in claim 14, wherein the plurality of physical format types include spiral and concentric data tracks.

18. A method as set forth in claim 14, wherein the direct access storage device is a disk drive and a physical format type includes a characterization as an inward spiral, an outward spiral, or a concentric data track.

19. A method as set forth in claim 18, wherein a physical format type includes a characterization of track to track pitch.

20. A method as set forth in claim 19, wherein a physical format type includes a characterization of write clock frequency.

21. A method as set forth in claim 20, wherein the disk drive comprises a plurality of disks having two major surfaces each for storing data, the major surfaces of the disk drives having corresponding addresses differing only a variable relating to the particular surface, characterization of a physical format type for a file allowing alternation of inward and outward spirals from major surface to major surface.

22. A method as set forth in claim 18, wherein spirals are track interleaved.

23. A method as set forth in claim 21, wherein a plurality of physical format types occur on one major surface.

24. The data processing system of claim 1, wherein the plurality of available physical format types includes:

at least a first spiral type track.

25. The data processing system of claim 24 and further comprising:

means for selecting pitch between revolutions or tracks.

26. The data processing system of claim 1, wherein the plurality of available physical format types includes:

time-multiplexed type tracks.

27. The data processing system of claim 1, wherein the plurality of available physical format types includes:

radially multiplexed type tracks.

28. The data processing system of claim 27, wherein the radially multiplexed type tracks are spiral or concentric.

29. The data processing system of claim 26, wherein the time multiplexed type tracks are spiral and concentric.

* * * * *